(12) United States Patent
Hayashi

(10) Patent No.: US 9,231,436 B2
(45) Date of Patent: Jan. 5, 2016

(54) VEHICULAR POWER SOURCE SYSTEM

(71) Applicant: DENSO CORPORATION, Kariya, Aichi-pref. (JP)

(72) Inventor: Hiroki Hayashi, Kariya (JP)

(73) Assignee: DENSO CORPORATION, Kariya (JP)

(*) Notice: Subject to any disclaimer, the term of this patent is extended or adjusted under 35 U.S.C. 154(b) by 618 days.

(21) Appl. No.: 13/711,735

(22) Filed: Dec. 12, 2012

(65) Prior Publication Data

US 2013/0154354 A1    Jun. 20, 2013

(30) Foreign Application Priority Data

Dec. 14, 2011   (JP) ................... 2011-273363

(51) Int. Cl.
*H02J 9/00* (2006.01)
*B60R 16/02* (2006.01)
*B60R 16/03* (2006.01)
*H02J 9/06* (2006.01)

(52) U.S. Cl.
CPC . *H02J 9/00* (2013.01); *B60R 16/02* (2013.01); *B60R 16/03* (2013.01); *H02J 9/005* (2013.01); *H02J 9/061* (2013.01); *Y02T 10/92* (2013.01)

(58) Field of Classification Search
CPC ............ H02J 9/00; H02J 9/005; H02J 9/061; B60R 16/02; B60R 16/03; Y02T 10/92
USPC ....................................... 307/10.7
See application file for complete search history.

(56) References Cited

U.S. PATENT DOCUMENTS

2005/0041352 A1* 2/2005 Seo .................. G06F 1/266
                                                       361/92
2006/0186867 A1   8/2006 Kataoka

FOREIGN PATENT DOCUMENTS

| JP | 57-211946 A | 12/1982 |
| JP | 05-158813 A | 6/1993 |
| JP | 06-14300 B2 | 2/1994 |
| JP | 2006-248265 A | 9/2006 |
| JP | 2007-015420 A | 1/2007 |
| JP | 2007-140908 A | 6/2007 |
| JP | 2007-162586 A | 6/2007 |
| JP | 2007-237768 A | 9/2007 |
| JP | 2008-143475 A | 6/2008 |

OTHER PUBLICATIONS

Office Action mailed Nov. 26, 2013 issued in corresponding JP patent application No. 2011-273363 (and English translation).

* cited by examiner

*Primary Examiner* — Thienvu Tran
*Assistant Examiner* — Kevin J Comber
(74) *Attorney, Agent, or Firm* — Posz Law Group, PLC

(57) ABSTRACT

A controller is provided in an in-vehicle electronic control unit (ECU) for controlling a backup power source to maintain continuous power supply to a memory in a standby state of ACC-OFF using a battery of a vehicle. The controller reduces dark current in the standby state by reducing an output voltage of the backup power source of the ECU depending on a state of the battery of the vehicle. The controller may be provided to not only the single ECU but also other ECUs in the vehicle, thereby reducing the dark current in the whole of the vehicle.

8 Claims, 4 Drawing Sheets

VEHICULAR POWER SOURCE SYSTEM

CROSS REFERENCE TO RELATED APPLICATION

The present application is based on Japanese Patent Application No. 2011-273363 filed on Dec. 14, 2011, the disclosure of which is incorporated herein by reference.

TECHNICAL FIELD

The present disclosure relates to a vehicular power source system to maintain using a backup power source a power supply state of an electronic circuit in an electronic unit, the electronic circuit needing a backup power supply in a standby state.

BACKGROUND

Patent document 1: JP 2007-237768 A

Vehicles each have a plurality of ECUs (Electronic Control Units). The ECUs need a power supply in a standby state of ACC-OFF, possibly causing a battery of the vehicle to run out. For example, an in-vehicle navigation ECU has generally a DRAM (Dynamic Random Access Memory) as a main memory; data stored in the DRAM may disappear when the battery of the vehicle runs out. Patent document 1 proposes a countermeasure to monitor whether the battery of the vehicle is going to run out. That is, when the battery is going to run out, the power source is shut down after evacuating or saving the data from the main memory of the ECU to a nonvolatile memory.

However, such a countermeasure requires the data saved in the nonvolatile memory to return to the main memory when subsequently being re-activated by switching from the standby state of ACC-OFF into the usual state of ACC-ON. This unfortunately increases an activation time. Thus, the ECU is provided with a backup power source receiving continuous power supply from the battery of the vehicle; the backup power source maintains a power supply to the main memory. This permits the high-speed start of the navigation ECU when the usual state of ACC-ON replaces the standby state of ACC-OFF. Such a configuration, however, maintains unchanged the output voltage from the backup power source to the main memory even when the standby state replaces the usual state. This needs significant dark current during the standby state, possibly causing the battery of the vehicle to run out.

SUMMARY

It is an object of the present disclosure to provide a vehicular power source system to suppress power discharge or consumption of a battery in a vehicle in cases that a backup power source maintains continuous power supply to an electronic unit in a standby state of ACC-OFF.

To achieve the above object, according to an example of the present disclosure, a vehicular power source system in a vehicle having a battery is provided as follows. The vehicular power source system includes a battery monitor unit, an electronic unit, an electronic circuit, and controller. The battery monitor unit monitors a remaining amount of the battery. The electronic unit includes a backup power source that receives continuously a power supply from the battery. The backup power source provides an output voltage in response to an external instruction. The electronic circuit is provided as a target for backup in the electronic unit. The electronic circuit receives a power supply from the backup power source. The controller is provided in the electronic unit, while receiving a power supply from the backup power source. The controller further instructs the backup power source to decrease an output voltage to the electronic circuit from a standard voltage to a predetermined lower voltage in a stipulated operating voltage range of the electronic circuit when determining that the remaining amount of the battery decreases to a predetermined amount in a standby state based on the remaining amount of the battery monitored by the battery monitor unit. The controller yet further instructs the backup power source to increase the output voltage to the electronic circuit from the predetermined lower voltage to the standard voltage when the standby state switches to a usual state.

According to the above configuration, when the remaining amount of the battery decreases to a predetermined amount in a standby state (e.g., ACC-OFF), the output voltage of the backup power supply is reduced to the predetermined lower voltage from the standard voltage of the stipulated operating voltage range of the electronic circuit which is a target for backup. Such a configuration may apply to all the electronic units in the vehicle, thereby decreasing the dark current in the whole of the vehicle in the standby state and suppressing the battery from running out or discharging. In this case, the electric current consumption during the standby state is stable. Even if the output voltage to the above backup-target electronic circuit is changed from the standard voltage to the predetermined lower voltage, the backup-target electronic circuit may be stable in operation. When the usual state (e.g., ACC-ON) subsequently replaces the standby state, the output voltage to the backup-target electronic circuit increases to the standard voltage from the predetermined lower voltage. The backup-target electronic circuit may receive a stable power supply.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Figure 1:
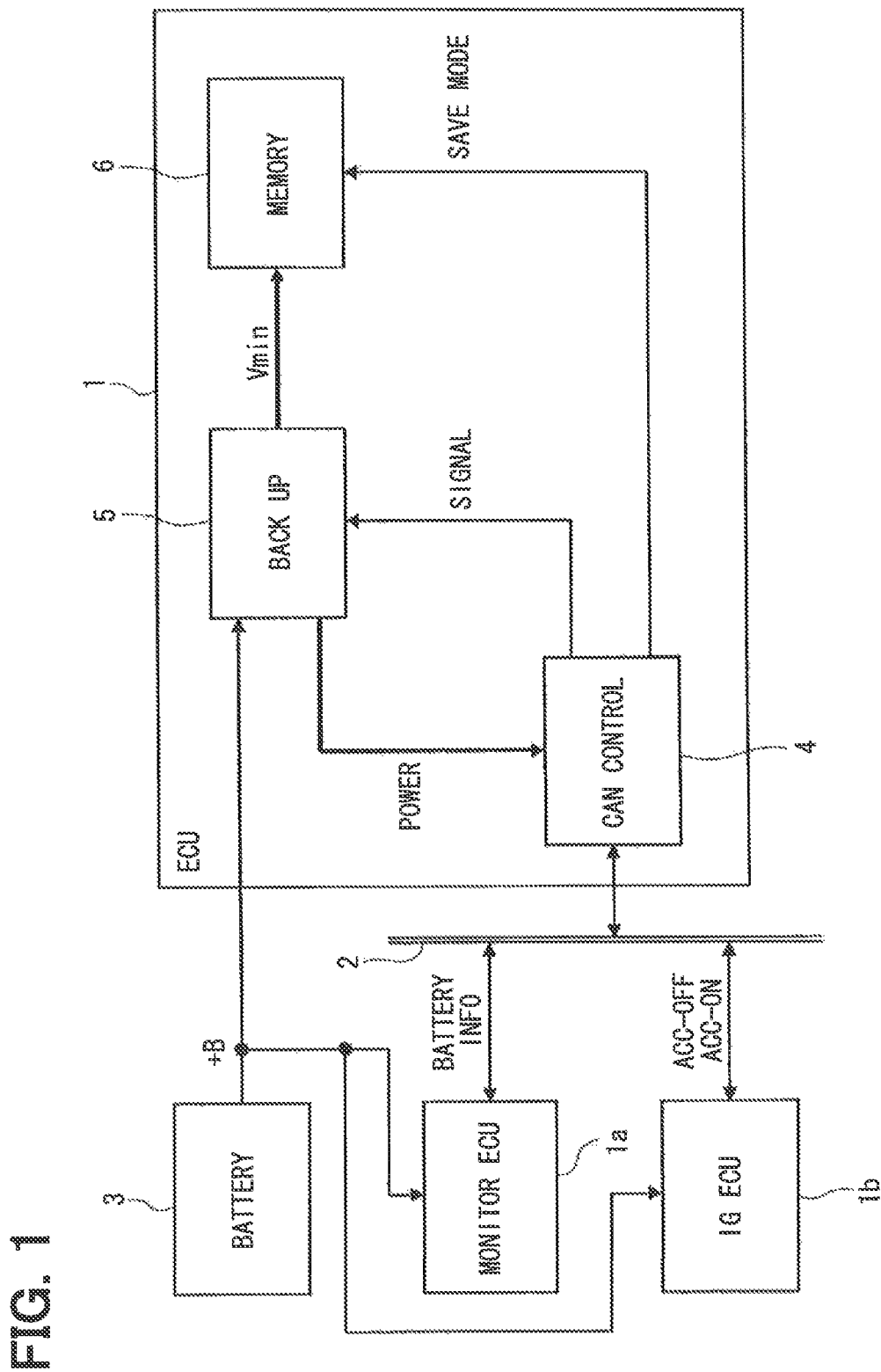
FIG. 1 is a diagram illustrating a configuration of an electronic control unit according to an embodiment of the present disclosure.
Figure 2:
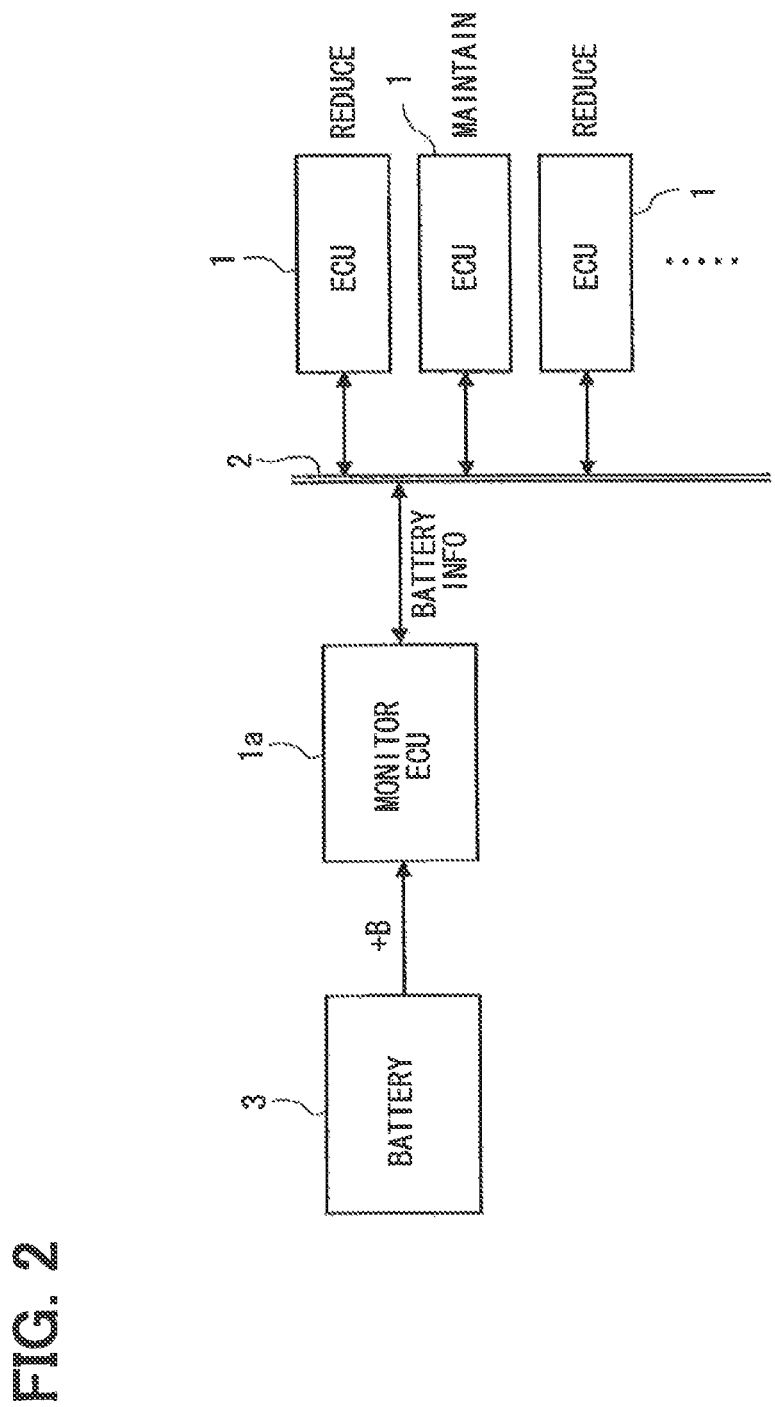
FIG. 2 is a diagram illustrating a schematic configuration of a system according to the embodiment.

An embodiment according to the present disclosure will be explained with reference to drawings. With reference to FIGS. 1, 2, a subject vehicle has CAN (Controller Area Network) as an in-vehicle local area network. The CAN interconnects several in-vehicle electronic control units 1 (ECUs) such as an engine ECU, a transmission ECU, a brake ECU, and a navigation ECU, to communicate or share the data such as processing data and detection data of in-vehicle sensors and actuators. Each ECU 1 includes a CAN controller to process data communication; the CAN controller connects with a CAN bus 2 composed of twisted pair wires excellent in noise-proof nature. The twisted pair wires have a recessive state when two wires receive the same potential and a dominant state when two wires receive different potentials. The ECU 1 in the dominant state occupies the communication bus while prohibiting the communication between other ECUs 1.

The CAN controller converts reception data and transmission data into communication signals according to the CAN protocols and controls communication with other ECUs 1 via the CAN bus 2. The CAN controller further controls communications with other ECUs 1 and monitors for detecting errors on communications such as bit errors, bit staffing errors, CRC errors, form errors, and ACK errors. When detecting errors, error data are transmitted to notify other ECUs 1 of the error occurrence.

The ECUs 1 include an ignition ECU 1b, which may be also referred to as a state signal output unit, device, or means to output an ACC-ON signal or ACC-OFF signal to the CAN bus 2 when the ACC-ON or ACC-OFF arises. ACC-ON may be also referred to a usual state; ACC-OFF may be also referred to as a standby state. For instance, when the user turns off the ignition switch so as to get off the vehicle, the ignition ECU 1b outputs an ACC-OFF signal (i.e., standby state signal) to the CAN bus 2. The ECUs 1 thereby receive the ACC-OFF signal from the ignition ECU 1b via the CAN bus 2. In contrast, when the user turns on the ignition switch to start driving the vehicle, the ignition ECU 1b outputs an ACC-ON signal (i.e., usual state signal) to the CAN bus 2. The ECUs 1 thereby receive the ACC-ON signal from the ignition ECU 1b via the CAN bus 2. It is noted that ACC represents accessories that signify in-vehicle accessory apparatuses such as a navigation apparatus, an air-conditioning apparatus, a wiper apparatus, and a power window. When the ignition switch is turned on, an ACC-ON signal is usually outputted from the ignition ECU 1b so as to permit the in-vehicle accessory apparatuses to operate; in contrast, when the ignition switch is turned off, an ACC-OFF signal is usually outputted from the ignition ECU 1b so as to preclude the in-vehicle accessory apparatuses from operating. Further, in the standby state of ACC-OFF state, some of in-vehicle accessory apparatuses such as a navigation apparatus usually receive a backup power supply from a battery 3 mounted in the vehicle. Further, it is noted that the ignition ECU 1b need not always output an ACC-ON signal or ACC-OFF signal in response to the ignition switch turning on or off.

The ECUs 1 include a battery monitor ECU 1a that may be also referred to as a battery monitor unit, device, or means. The battery monitor ECU 1a monitors a voltage of the battery 3 mounted in the vehicle and transmits the battery voltage information indicating a remaining battery amount of the battery 3 to the CAN bus 2. Each ECU 1 receives the battery voltage information from the battery monitor ECU 1a via the CAN bus 2. Each ECU 1 determines based on the battery voltage indicated by the received battery voltage information whether to reduce the backup power voltage of each ECU 1 at the time when being notified of the start of the standby state of ACC-OFF based on the signal outputted from the ignition ECU 1b.

Returning to FIG. 1, each ECU 1 includes a microcomputer 4, a backup power source 5, and a memory 6 composed of DRAM serving as a backup-target electronic circuit. The microcomputer 4, which may be referred to as a controller or control device or means, is composed of a one-chip microcomputer including the above CAN controller, a CPU, timers, A/D conversion circuits, and communicate information with other microcomputers 4 of other ECUs 1 via the CAN bus 2.

Each ECU 1 is enabled to vary the backup power voltage during the ACC-OFF. The microcomputer 4 determines whether the battery 3 may run out based on the battery voltage information obtained from the battery monitor ECU 1a monitoring the state of the battery 3 when receiving the ACC-OFF signal from the ignition ECU 1b. When determining that the battery 3 may run out, the microcomputer 4 instructs the memory 6 to move to a power saving mode, and then outputs a power control signal requesting reduction of output voltage to the backup power source 5. That is, the memory 6 may be assigned with the power saving mode set by the microcomputer 4. The power saving mode has two states. The first state permits a memory controller to execute only a minimum operation. The second state stops the memory controller while self-refreshing using a hardware configuration. Either state is selectable by changing a CKE (clock enabled) signal into a low level, or providing an auto-refresh signal. In contrast, the memory 6 is operable in a stipulated operating voltage range. The memory 6 receives a standard voltage, which is a central voltage in the stipulated operating voltage range, in the usual state, whereas receiving a predetermined lower voltage, which is lower than the standard voltage, in the standby state, thereby reducing the consumed electric current during the standby state. Thus, in the standby state, the memory 6 switches over to the power saving mode to receive the predetermined lower voltage lower than the standard voltage within the stipulated operating voltage range, thereby suppressing the consumed electric current effectively. In the standby mode, the reduction of the output voltage from the backup power source 5 to the memory 6 provides an advantage in the power saving mode of the memory 6. Alternatively, the output voltage from the backup power source 5 to the memory 6 may be reduced without assigning the power saving mode to the memory 6. Yet alternatively, another power saving mode may apply.

The backup power source 5 outputs the lower limit voltage of the data holding voltage range, i.e., the stipulated operating voltage range of the memory 6 against the voltage, e.g., 12V, supplied from an outside when instructed by the microcomputer 4 to reduce the voltage. For instance, a typical DRAM of DDR2 SDRAM (Double-Data-Rate2 Synchronous Dynamic Random Access Memory) has a standard voltage of 1.8 V, upper limit voltage of 1.9 V, and lower limit voltage of 1.7 V in the stipulated operating voltage range. Thus, in the standby state, the output voltage reduces from the standard voltage of 1.8 V to the lower limit voltage of 1.7 V. It is noted that the backup power source 5 operates during the standby state of ACC-OFF while reducing the output voltage to the memory 6.

Figure 4:
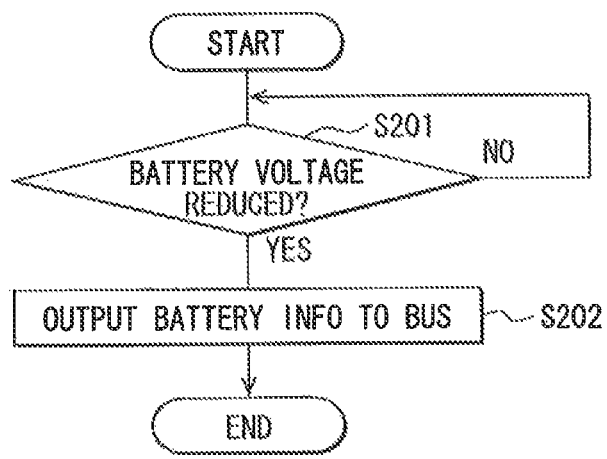
FIG. 4 is a diagram illustrating a flowchart of a control process of a battery monitor electronic control unit.

The following will explain a control process by the battery monitor ECU 1a with reference to FIG. 4. It is further noted that a flowchart in the present application includes sections (also referred to as steps), which are represented, for instance, as S201 or S102. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section, including or not including a function of a related apparatus. Further, the hardware section may be inside of a microcomputer.

At S201, the battery monitor ECU 1a monitors whether the battery voltage of the battery 3 varies. When determining that the battery voltage varies to a predetermined value, the battery voltage information indicating a voltage, i.e., remaining amount, of the battery 3 is outputted to the CAN bus 2 (S202). The present process once ends and again repeats.

In contrast, as explained above, the ignition ECU 1b outputs an ACC-ON signal or ACC-OFF signal to the CAN bus 2 when the ACC-ON or ACC-OFF arises. Therefore, when the user turns off the ignition switch, i.e., switching over to the ACC-OFF, so as to get off the vehicle, each ECU 1 receives the ACC-OFF signal from the ignition ECU 1b via the CAN bus 2.

Figure 3:
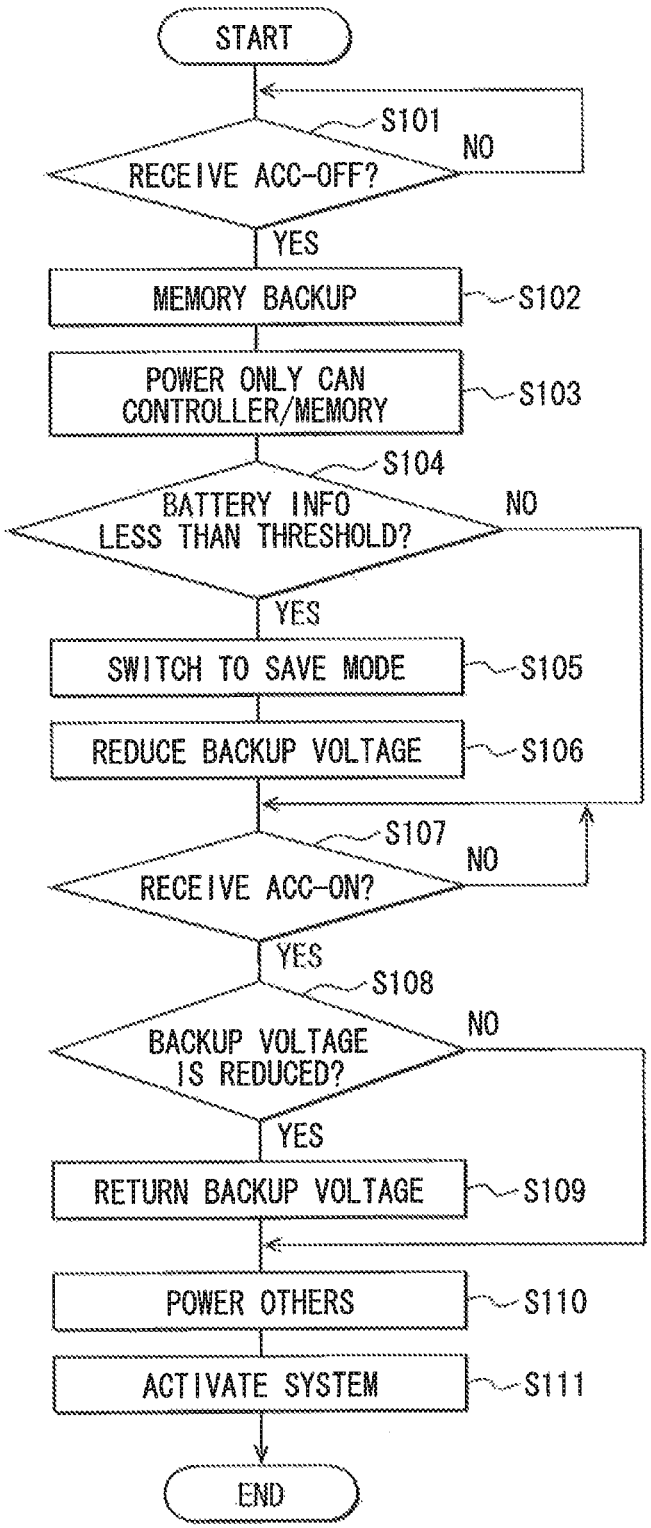
FIG. 3 is a diagram illustrating a flowchart of a control process by an electronic control unit.

The following will explain the control process of the navigation ECU 1 as one example of the ECU 1 with reference to FIG. 3. At S102, the navigation ECU 1 determines whether to receive the ACC-OFF signal from the ignition ECU 1b via the CAN bus 2. When receiving the ACC-OFF signal, a memory backup process is executed which evacuates or saves the data requiring backup among the processing data (S102). The power supply to components or apparatuses other than the memory 6 and the microcomputer 4 is shut down (S103).

At S104, the navigation ECU determines whether the battery voltage information acquired from the battery monitor ECU 1a via the CAN bus 2 is lower than a threshold value predetermined to the navigation ECU. When being lower than the threshold value, the memory 6 is switched to the power saving mode (S105). A voltage control signal is then transmitted to the backup power source 5 (S106). The power supply voltage to the memory 6 falls in the power saving mode; thus, the consumed electric current of the memory 6 is suppressed to be minimal.

As explained above, the vehicle is in the standby state of ACC-OFF where the backup power source 5 continues the power supply to the memory 6 and the microcomputer 4. In this case, the output voltage from the backup power source 5 to the memory 6 decreases to the lower limit voltage of 1.7 V from the standard voltage of 1.8 V within the stimulated operating power range of the memory 6. The current consumption of the memory 6 is, however, stable in the standby state; the memory 6 can execute a stable refresh operation. The standby state permits the dark current of the memory 6 to reduce. This also reduces the dark current of the navigation ECU, i.e., the whole of the vehicle, suppressing the consumption or discharge of the battery 3.

In contrast, at S107, the microcomputer 4 determines in the standby state whether to receive the ACC-ON signal from the ignition ECU 1b via the CAN bus 2. The ignition ECU 1b outputs the ACC-ON signal when the ignition switch is manipulated or turned into the on state. When receiving the ACC-ON signal while the output voltage of the backup power source 5 is reduced (S108: YES), the output voltage to the memory 6 is returned to the original standard voltage by outputting the power source control signal to the backup power source 5 (S109). Thereby, the power supply to components or apparatuses other than the memory 6 and the microcomputer 4 restarts (S110). The system thereby activates (S111). Such a restart or reboot due to ACC-ON needs a waiting time of several milliseconds for returning the power supply voltage to the original one or stable state. The waiting time of several milliseconds for the DRAM is, however, short enough to preclude an actual problem as compared with a waiting time of several seconds for conventional nonvolatile memories. When the output voltage of the backup power source 5 is not reduced (S108: NO), the power supply to components or apparatuses other than the memory 6 and the microcomputer 4 restarts (S110). The system activates (S111).

As explained above, when the output voltage of the backup power source 5 in the navigation ECU is reduced, the backup power source 5 needs to wait for a while to become stable in order to return the power supply voltage to the original standard voltage from the lower limit voltage at ACC-ON. This case needs a little longer time than a conventional case that the power supply voltage is maintained unchanged even in the standby state of ACC-OFF. To that end, the following operates. When the decline of the battery voltage is remarkable, all the ECUs 1 reduce the output voltages of the backup power sources 5. When the decline of the battery voltage is not so remarkable, the output voltages of the backup power sources 5 are reduced with respect to only the ECUs 1 not having a disadvantage in the activation time whereas being not reduced with respect to the ECUs 1 having a disadvantage in the activation time. This may reduce the dark current while suppressing the influence on the vehicle to the minimum.

The present embodiment may provide the following advantages. The ECU 1 is provided with the microcomputer 4 enabling the reduction of the power supply voltage or the output voltage of the backup power source 5 to the memory 6 in the standby state of ACC-OFF. The backup power supply voltage of the ECU 1 reduces depending on the state of the battery 3, thereby reducing the dark current in the standby state and helping prevent the battery 3 from running out. The microcomputer 4 may be provided to not only a single ECU 1 but also other ECUs 1 in the vehicle, thereby reducing the dark current in the whole of the vehicle.

When reducing the power supply voltage from the backup power source 5 to the memory 6, the memory 6 switches over to the power saving mode. This suppresses the consumed electric current of the memory 6 to the minimum. For example, when the remaining amount of the battery 3 is small, the dark current of the whole vehicle can be lowered by reducing the backup power supply voltages of all the ECUs 1. When the remaining amount of the battery 3 has a margin, the backup power voltage is reduced only with respect to the ECUs 1 not having a disadvantage in the delay of the activation time. Thus, an overall control of the vehicle can be made depending on the state of the battery 3.

Other Embodiments

The present disclosure is not limited only to the above-mentioned embodiment, and can be modified or extended as follows. The memory 6 is not only one target electronic circuit that is a target for reducing the backup power supply voltage from the backup power source 5 in the standby state of ACC-OFF. Another microcomputer 4 or electronic circuit may be such a target electronic circuit. This case may be equipped to move the microcomputer to the standby state in the power saving mode and then activate it from the standby state when accessed from an outside. The microcomputer 4 in the standby state may also acquire the battery voltage information via the CAN bus 2, and reduces the backup power supply voltage when determining that the battery is going to run out.

Multiple configurations may be provided to reduce the dark current of the ECU 1 step by step depending on the degree of the decline in the battery voltage. That is, the ECU 1 has several steps or stages of the power saving mode. The battery monitor ECU 1a may select one of the several steps depending on the present state of the battery 3 in the standby state of ACC-OFF based on the battery voltage information presently received via the CAN bus 2. Further, the backup power source 5 may be shut off. The following will explain the case to have several steps for reducing the backup power supply voltage.

The first step taking place when the degree of the battery voltage decline is small reduces the backup power supply voltage to a voltage a little lower than the standard voltage while the memory 6 is in the standby operation state. The second step taking place when the degree of the battery voltage decline is middle reduces the backup power supply voltage to the lower limit while the memory 6 is in the standby operation state. The third step taking place when the degree of the battery voltage decline is great saves or evacuates the data of the memory 6 in a nonvolatile memory and turns off the power supply to the memory 6. When it is determined that the battery voltage decreases in the standby state of ACC-OFF, the backup power source 5 maintains the power supply to the microcomputer 4 to be in an operable state. The microcomputer 4 may switch over to a stop state after outputting the power source control signal to the backup power source 5, and again return to an operable state at ACC-ON. In addition, when it is determined that the battery voltage reduces at ACC-OFF, the power supply from the backup power source 5 to the microcomputer 4 may stop, and then restart at ACC-ON. Furthermore, in addition to the microcomputer 4, a reset CPU may be provided to control the power supply to the microcomputer 4. The present disclosure may apply to a hybrid vehicle, electric vehicle, or other types of vehicles without need to be limited to the vehicle having an engine.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicular power source system in a vehicle having a battery,
the vehicular power source system comprising:
a battery monitor unit that monitors a remaining amount of the battery;
an electronic unit including a backup power source that receives continuously a power supply from the battery, the backup power source providing an output voltage in response to an external instruction;
an electronic circuit provided as a target for backup in the electronic unit, the electronic circuit receiving a power supply from the backup power source; and
a controller provided in the electronic unit, the controller receiving a power supply from the backup power source,
the controller instructing the backup power source to decrease an output voltage to the electronic circuit from a standard voltage to a predetermined lower voltage in a stipulated operating voltage range of the electronic circuit when determining that the remaining amount of the battery decreases to a predetermined amount in a standby state, based on the remaining amount of the battery monitored by the battery monitor unit,
the controller instructing the backup power source to increase the output voltage to the electronic circuit from the predetermined lower voltage to the standard voltage when the standby state switches to a usual state.

2. The vehicular power source system according to claim 1, wherein
the electronic circuit is enabled in a power saving mode where a consumed electric current is lowered; and
the controller instructs the backup power source to decrease the output voltage to the electric circuit from the standard voltage to the predetermined lower voltage in a state where the electronic circuit is switched into the power saving mode.

3. The vehicular power source system according to claim 1, wherein:
the predetermined lower voltage is a lower limit voltage of the stipulated operating voltage range.

4. The vehicular power source system according to claim 1, wherein:
the predetermined lower voltage is one of a plurality of voltages lower than the standard voltage in the stipulated operating voltage range.

5. The vehicular power source system according to claim 1, wherein:
the electronic circuit is a dynamic random access memory (DRAM).

6. The vehicular power source system according to claim 1, wherein:
the electronic unit is a subject electronic control unit of a plurality of electronic control units (ECUs);
the battery monitor unit is a battery monitor electronic control unit (ECU) connected with the plurality of electronic control units via an in-vehicle network, the battery monitor unit outputting battery remaining amount information indicating the remaining amount of the battery to the in-vehicle network; and
the subject electronic control unit receives the battery remaining amount information from the battery monitor electronic control unit via the in-vehicle network.

7. The vehicular power source system according to claim 6, wherein;
the plurality of electronic control units includes a specified electronic control unit that requires a short-time activation; and
the controller does not instruct the backup power source to decrease the output voltage to the specified electronic control circuit from the standard voltage to the predetermined lower voltage even when determining that the remaining amount of the battery decreases to the predetermined amount in the standby state.

8. The vehicular power source system according to claim 1, further comprising:
a state signal output unit that outputs a signal that indicates either the standby state or the usual state based on an instruction of a user,
wherein the controller determines either the standby state or the usual state based on the signal outputted by the state signal output unit.

* * * * *